US008774524B2

(12) United States Patent
Tsunematsu

(10) Patent No.: US 8,774,524 B2
(45) Date of Patent: Jul. 8, 2014

(54) IMAGE PROCESSING APPARATUS, IMAGE PROCESSING METHOD, AND STORAGE MEDIUM OF IMAGE PROCESSING METHOD

(75) Inventor: Yuuichi Tsunematsu, Kowloon (HK)

(73) Assignee: Canon Kabushiki Kaisha, Tokyo (JP)

( * ) Notice: Subject to any disclaimer, the term of this patent is extended or adjusted under 35 U.S.C. 154(b) by 470 days.

(21) Appl. No.: 13/044,449

(22) Filed: Mar. 9, 2011

(65) Prior Publication Data

US 2011/0229026 A1 Sep. 22, 2011

(30) Foreign Application Priority Data

Mar. 18, 2010 (JP) ................................ 2010-062503
Mar. 1, 2011 (JP) ................................ 2011-044132

(51) Int. Cl.
*G06K 9/48* (2006.01)
*G06K 9/46* (2006.01)
*G06K 9/68* (2006.01)

(52) U.S. Cl.
USPC ........... 382/199; 382/197; 382/200; 382/203; 382/218

(58) Field of Classification Search
None
See application file for complete search history.

(56) References Cited

U.S. PATENT DOCUMENTS

| | | | | |
|---|---|---|---|---|
| 4,817,173 A * | 3/1989 | Furukoori | ..................... | 382/197 |
| 5,237,626 A * | 8/1993 | Forslund et al. | ............. | 382/256 |
| 5,301,248 A * | 4/1994 | Takanori et al. | ............... | 382/147 |
| 5,548,695 A * | 8/1996 | Asano et al. | .................. | 345/619 |
| 6,021,221 A * | 2/2000 | Takaha | .......................... | 382/199 |
| 6,181,438 B1* | 1/2001 | Bracco et al. | .................. | 358/1.9 |
| 6,310,970 B1* | 10/2001 | Doll | .............................. | 382/163 |
| 6,560,361 B1* | 5/2003 | Collins | ......................... | 382/203 |
| 7,889,938 B2* | 2/2011 | Ishida | .......................... | 382/242 |
| 8,253,802 B1* | 8/2012 | Anderson et al. | ............. | 348/169 |
| 2005/0180645 A1* | 8/2005 | Hasegawa et al. | ............ | 382/239 |
| 2005/0185852 A1* | 8/2005 | Song et al. | .................... | 382/243 |
| 2005/0226538 A1* | 10/2005 | Di Federico et al. | ......... | 382/299 |
| 2006/0002614 A1* | 1/2006 | LeHenaff | ...................... | 382/242 |
| 2007/0133862 A1* | 6/2007 | Gold et al. | .................... | 382/149 |
| 2008/0123945 A1* | 5/2008 | Andrew et al. | ............... | 382/164 |

FOREIGN PATENT DOCUMENTS

| | | |
|---|---|---|
| JP | 3026592 | 3/2000 |
| JP | 2005-310070 | 11/2005 |
| JP | 2006-344069 | 12/2006 |

* cited by examiner

*Primary Examiner* — Thomas Conway
(74) *Attorney, Agent, or Firm* — Fitzpatrick, Cella, Harper & Scinto

(57) ABSTRACT

An image region extracting unit binarizes image data inputted from an image inputting unit and labels the binarized image data based upon a feature value of a pixel to be segmentized into a plurality of image regions. A contour connection determining unit 104 determines whether or not connection points connecting contour lines of the respective image regions extracted by a contour extracting unit each other exist. A contour modifying unit, when it is determined that the connection points exist by the contour connection determining unit, connects the contour lines each other at the connection points to modify the contour line.

8 Claims, 11 Drawing Sheets

CONSTRUCT CLOSED REGION BY EIGHT LINKS

INNER CONTOUR IS CONNECTED TO OTHER CONTOUR AT THREE OR MORE POINTS

CONSTRUCT CLOSED REGION BY EIGHT LINKS

INNER CONTOUR IS CONNECTED
TO OTHER CONTOUR AT THREE OR MORE POINTS

| LINE NUMBER | END POINT COORDINATE | | DIRECTION |
|---|---|---|---|
| | STARTING POINT | END POINT | |
| 1 | (0, 1) | (5, 1) | RIGHT |
| 2 | (0, 1) | (0, 2) | LOWER |
| 3 | (0, 2) | (5, 2) | RIGHT |
| 4 | (5, 1) | (5, 2) | LOWER |
| 5 | (1, 4) | (1, 4) | RIGHT |

| IMAGE REGION | BOUNDARY LINE |
|---|---|
| 1 | LINE 1, LINE 4, LINE 3 (REVERSE ORDER), LINE 2 (REVERSE ORDER) |
| 2 | LINE 5 |

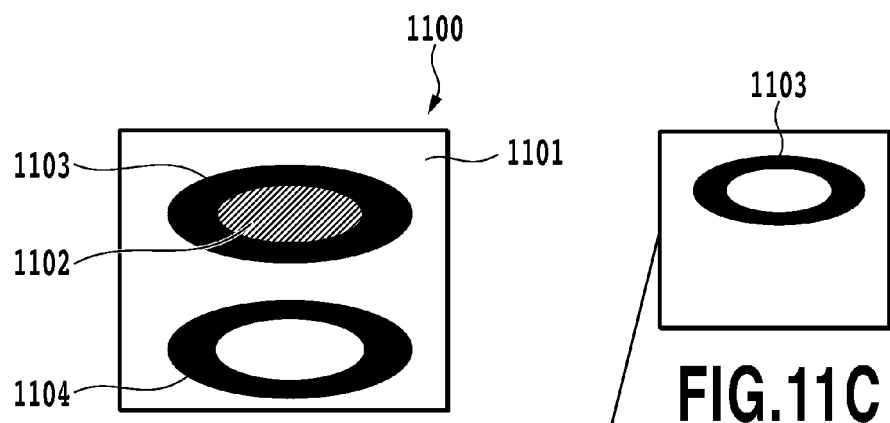
FIG.11A
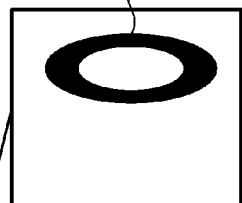
FIG.11C
FIG.11D
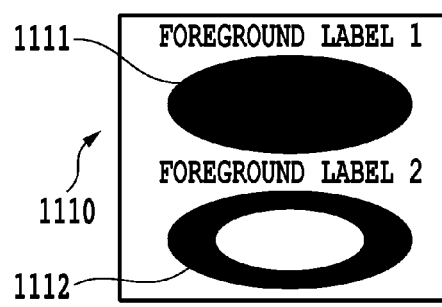
FIG.11B
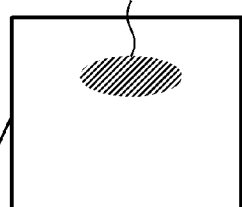
FIG.11E

IMAGE PROCESSING APPARATUS, IMAGE PROCESSING METHOD, AND STORAGE MEDIUM OF IMAGE PROCESSING METHOD

BACKGROUND OF THE INVENTION

1. Field of the Invention

The present invention relates to an image processing apparatus, and particularly to an image processing apparatus which can extract a contour line from a specific image region in image data of a processing target to obtain the same contour line between the image region and an image region adjacent thereto and a method of the image processing.

2. Description of the Related Art

Owing to recent progress in computerization of information, there has widely spread a system in which a paper document is not stored physically as it is, but a content of the paper document is optically read by a scanner or the like, the read data is stored as an electronic document, and this electronic document is transmitted to the other apparatus as needed. This electronic document contains, for example, a character region composed of characters or a photo region composed of photos photographing landscapes, and the like. There are some cases where the character region or the photo region is expanded or compressed to be displayed on a display apparatus or to be outputted to a printing apparatus or the like. In this case, high reproducibility of data displayed or outputted is in much demand. Therefore, there has been proposed a technology in which in regard to the character region or the photo region in the electronic document, a contour line is extracted from each group of pixels (hereinafter, image region) constructed of pixels each having a constant feature value. Then the extracted contour line is converted into vector data for enhancing the above reproducibility (for example, see Japanese Patent Publication No. 3026592).

Japanese Patent Publication No. 3026592 discloses a technology for being capable of extracting all contour lines from binary image by one time of a raster scan only. In this technology, vectors between pixels in a horizontal direction and in a perpendicular direction are detected based upon relation between both a target pixel set in an image and a close pixel in close proximity to the target pixel and a connection state of the vectors between the pixels each other is determined. The contour line of a region in an image is extracted based upon the determined connection relation of the vectors between the pixels. Since the contour line is extracted not from a center position of the pixel but from an edge unit of the pixel, the contour line can be extracted even from the image region constructed of pixels having one pixel width such as a narrow line. Further, the publication discloses that it is possible to extract not only a contour line from an image region composed of a pixel group in which pixels in the image are connected by four connections but also a contour line from an image region composed of a pixel group in which pixels in the image are connected by eight connections. In addition, the four connections means that a pixel is adjacent to at least one of adjacent pixels in the upper, lower, right and left sides (four vicinities). The eight connections means that a pixel is adjacent to pixels in the upper, lower, right, left, upper right, lower right, upper left, and lower left sides. For example, as shown in FIG. 4A, in a gray image region, the pixels are connected by four connections, and as shown in FIG. 4B, in a gray image region, the pixels are connected by eight connections.

Contour lines extracted by using the technology described in Japanese Patent Publication No. 3026592 will be explained with reference to FIGS. 3A-3C. A contour line 311 is extracted from a black image region 301 in the binary image shown in FIG. 3A. The contour line 311 is constructed of vector data in the vector form showing an outer periphery of the image region 301. It should be noted that since the contour line 311 shows the outer periphery of the image region 301, a contour line is referred to as an outer contour. Next, as shown in FIG. 3B, a contour line 312 and a contour line 313 are extracted from an image region 302. Since the contour line 313 shows an inner periphery of the image region 302, it is referred to as an inner contour. That is, the contour lines extracted from the image region 302 are constructed of one outer contour (contour line 312) and one inner contour (contour line 313). Next, as shown in FIG. 3C, a contour line 314, a contour line 315 and a contour line 316 are extracted from an image region 303. That is, the contour lines extracted from the image region 303 are constructed of one outer contour (contour line 314) and two inner contours (contour lines 315 and 316). In the contour extracting processing disclosed in Japanese Patent Publication No. 3026592, both the outer contour and inner contour are extracted by a raster scan with a matrix unit of 3×3 pixels.

SUMMARY OF THE INVENTION

Japanese Patent Publication No. 3026592 discloses the invention for extracting contour lines from a binary image. If applied as follows, it may be possible to extract contour lines from a multi-valued image made of plural colors. That is, a color is focused in order on the respective colors contained in the multi-valued image, and then a binary value is generated such that a pixel of the focused color is defined as 1 and pixels of colors other than the focused color are defined as 0. And then, the technology disclosed in Japanese Patent Publication No. 3026592 may be applied to extracting the contour line from the above binary image. However, when extracting contour line for every color from an image region, it may be possible that an inner contour as a contour line extracted from an image region is not identical to an outer contour as a contour line extracted from a different image region internally included in the image region. Here, the identical case and the non-identical case will be explained with reference to FIGS. 4A-4F. First, as an example of the identical case, there will be explained a case of extracting contour lines in each of a white image region 401 and a gray image region 402 shown in FIG. 4A. If the white image region 401 is attracted, a contour line 411 (outer contour) and a contour line 412 (inner contour) are extracted from the white image region 901. On the other hand, if the gray image region 402 is attracted, a contour line 912 (outer contour) is extracted from the gray image region 402. At this time, the contour line 412 (inner contour) of the white image region 401 is identical to the contour line 412 (outer contour) of the gray image region 902. Additionally, in the case shown in FIG. 4A, contour lines extracted by four connections and eight connections are respectively the same shape.

On the other hand, as an example of the non-identical case, there will be explained a case of extracting contour lines from each of a white image region 403 and a gray image region 404 shown in FIG. 4B. For example, when extracting contour lines from the white image region 403 by four connections, a contour line 413 (outer contour) and a contour line 414 (inner contour) are extracted, as shown in FIG. 4C. On the other hand, as shown in FIG. 4D, when extracting contour lines from the gray image region 404 by four connections, a contour line 415 (outer contour), a contour line 416 (outer contour) and a contour line 417 (outer contour) are extracted such that it is determined that a pixel in a declined direction to a target pixel is not connected by four connections. As this case shows, the inner contours as the contour lines of the white image region 403 may be not identical to the outer contours as the contour lines of the gray image region 404, when extracting contour lines by four connections. That is, one contour line (inner contour line 414) is extracted from the white image region 403. On the other hand, three contour lines (outer contour lines 415, 416, and 417) are extracted from the grey image region 404. Therefore, contour lines extracted from each of the white image region and the grey image region are not identical. Additionally, when extracting contour lines from the white image region 403 by eight connections, a contour line 418 (outer contour) and contour lines 419 to 421 (inner contours) are extracted as shown in FIG. 4E, such that it is determined that a group of white pixels connected in the declined direction is connected by eight connections. On the other hand, when extracting contour lines from the gray image region 404 by eight connections, a contour line 422 (outer contour) is extracted as shown in FIG. 4F such that it is determined that a group of grey pixels connected in the declined direction is connected by eight connections. In this manner, the inner contours as the contour lines of the white image region 403 may not be identical to the outer contours as the contour lines of the gray image region 404, when extracting contour lines by eight connections. Although each of the contour line (inner contour) of the white image region 403 and the contour line (outer contour) of the gray image region 404 can be expressed by the same contour line, it may be possible that different contour lines are extracted as the respective contour lines, as described above. When two different contour lines are thus extracted on the boundary from between the image regions and then vector data are generated by performing functional approximation of the extracted contour lines, different vector data may be generated in regard to the image regions.

In addition, if narrow lines containing locations connected in an inclined direction as shown in FIG. 5A exist in an image data, the narrow lines are finely segmentized by four connections, since the narrow lines are segmentized at the locations connected in the inclined direction. In addition, when the functional approximation is performed for each contour line finely segmentized, since the image data is configured as shown in FIG. 5B, an image quality of the vector data to be outputted is remarkably degraded. Therefore, it is preferable to extract the contour line of such a narrow line by eight connections as much as possible.

The present invention is made in order to modify contour lines extracted from different image regions so that the contour lines are almost the same one.

For solving the aforementioned problem, the invention according to claim 1 is an image processing apparatus comprising: an image region extracting unit configured to extract image regions having the same featuring value and connected by eight links in image data; a contour extracting unit configured to extract a contour line from each of the image regions extracted by the image region extracting unit; a contour connection determining unit configured to, when plural inner contours exist in the contour line extracted by the contour extracting unit, determine whether or not a connection point for connecting the contour lines each other exists; and a contour modifying unit configured to, when the contour connection determining unit determines that the connection point exists, connect the contour lines at the connection point to generate a new contour line and modify the contour line with the generated contour line.

According to the present invention, one appropriate contour line can be obtained at the boundary between the image regions.

Further features of the present invention will become apparent from the following description of exemplary embodiments (with reference to the attached drawings).

BRIEF DESCRIPTION OF DRAWINGS

FIGS. 11A-11E are diagrams for explaining processing for determining whether or not an image region in Embodiment 2 is in contact with the background.

DESCRIPTION OF THE EMBODIMENTS (Embodiment 1)

Hereinafter, an embodiment of the present invention will be explained with reference to the accompanying drawings. However, elements described in the embodiment are absolutely shown as an example and the technical scope of the present invention will be defined by the scope of claims and will not be limited by individual embodiments hereinafter.

Figure 2:
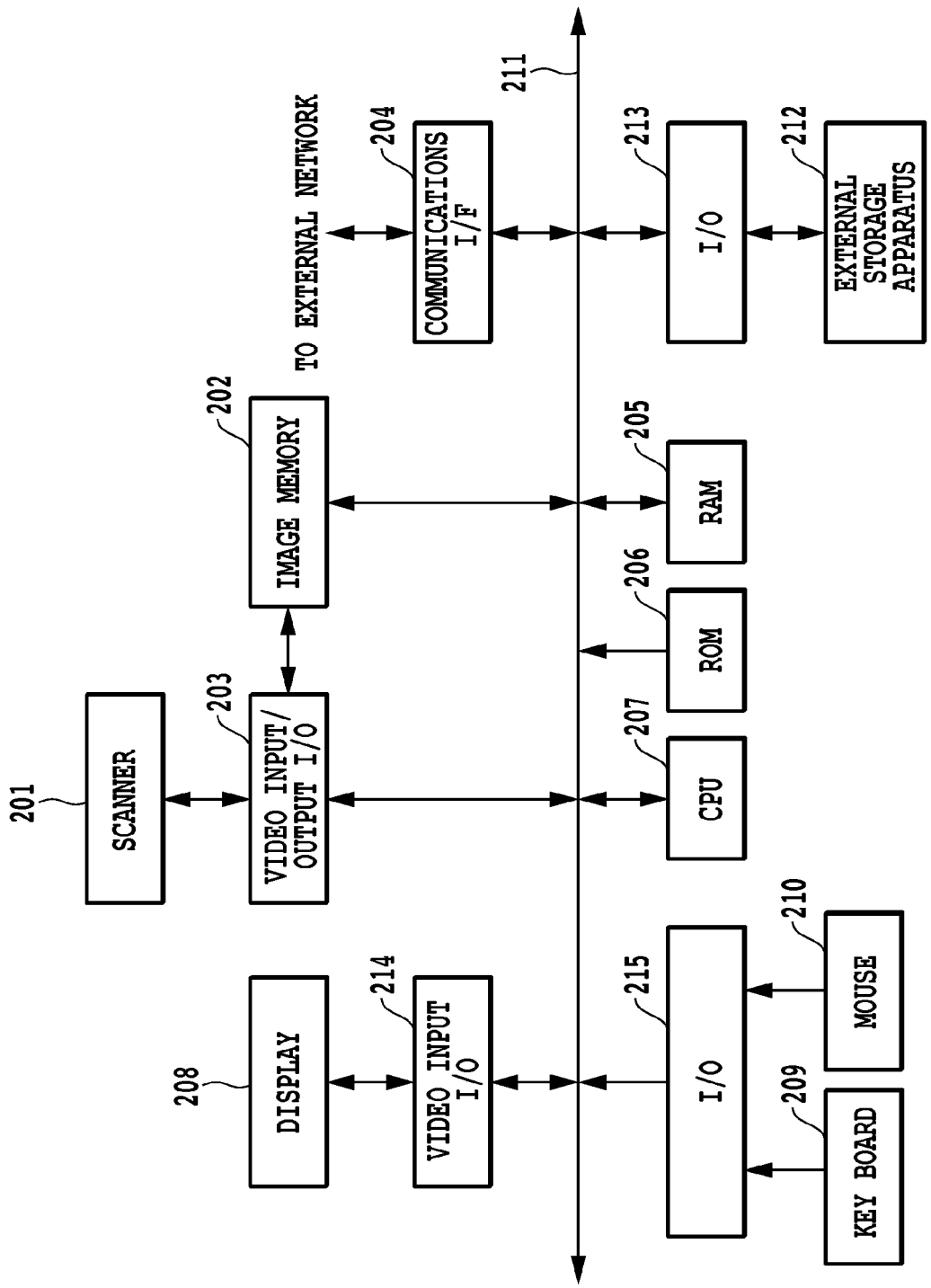
FIG. 2 is a block diagram of the image processing apparatus according to the embodiment of the present invention.
Figure 3A:
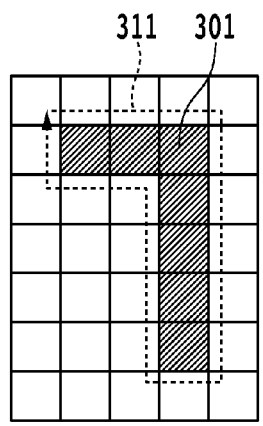
FIGS. 3A-3C are diagrams for explaining contour lines of an image region according to one embodiment of the present invention.
Figure 3B:
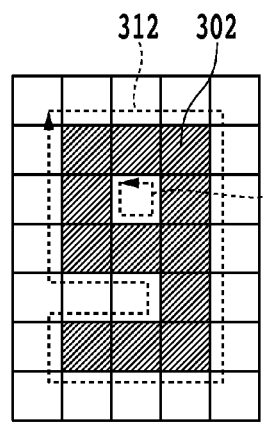
Figure 3C:
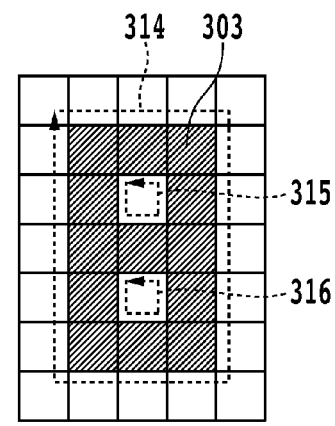
Figure 4A:
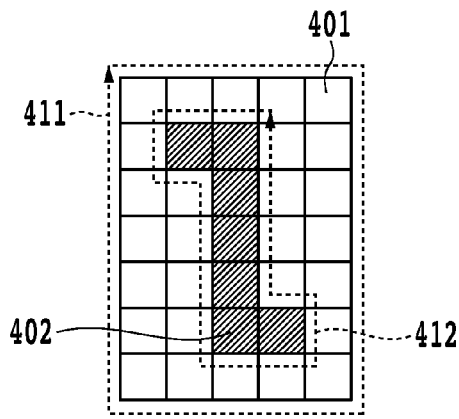
FIGS. 4A-4F are diagrams for explaining that contour lines extracted differ due to a difference of a linking method.
Figure 4B:
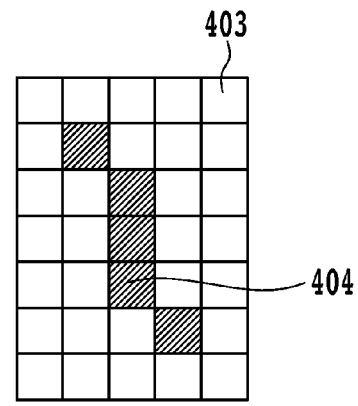
Figure 4C:
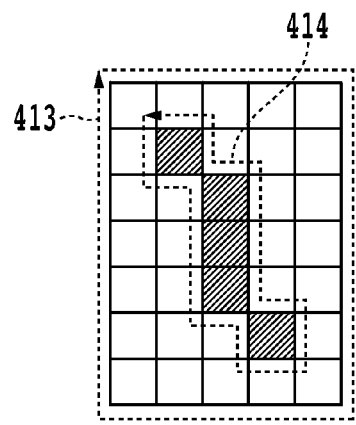
Figure 4D:
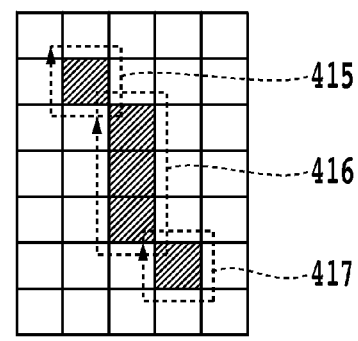
Figure 4E:
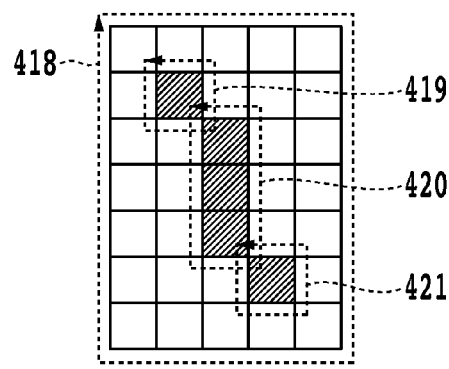
Figure 4F:
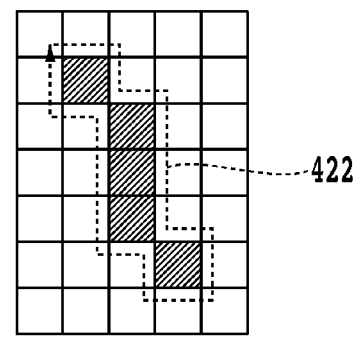
Figure 5A:
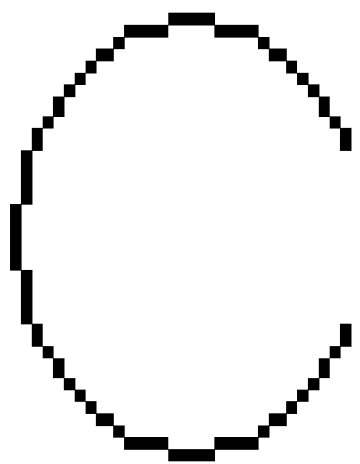
FIGS. 5A-5B are diagrams showing an output example of an image in which extracted contour lines are unified to a four connections to perform a functional approximation to the boundary line.
Figure 5B:
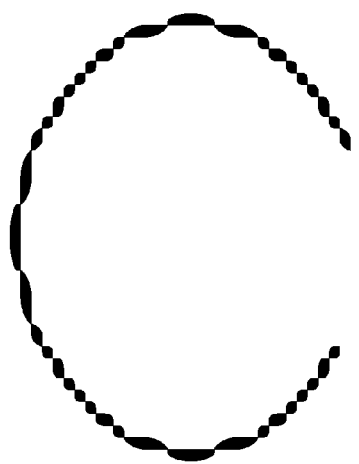

An example of configuration of an image processing apparatus in an embodiment according to the present invention will be explained with reference to a block diagram in FIG. 2. A CPU 207 is a central processing unit for controlling an entire image processing apparatus. A ROM (Read Only Memory) 206 is a read-exclusive storage medium for storing programs and parameters. A RAM (Random Access Memory) 205 temporarily stores programs and data supplied by an external apparatus and the like. A scanner 201 is an optical type of reading apparatus which can perform a photoelectric scan on a paper medium such as a document to obtain electronic image data. The scanner 201 is connected to a bus 211 through an image input/output I/O 203 and can communicate with other apparatuses connected to the bus 211. An image memory 202 retains image data read by the scanner 201, and the like. An external storage apparatus 212 is constructed of a hard disc or a memory card, an optical disc such as a detachable flexible disc (FD) and a compact disc (CD), a magnetic or optical card, an IC card, a memory card, and the like for retaining the data. An I/O 213 is connected to the external storage apparatus 212 and the bus 211 and is an input/output apparatus which enables communications in data between the external storage apparatus 212 and other apparatuses connected to the bus 211. An I/O 215 is connected to a key board 209, a mouse 210, and the bus 211 and is an input/output apparatus which receives an operation of a user through the key board 209 and the mouse 210 and outputs the received data to other apparatuses connected to the bus 211. A video I/O 214 is connected to a display apparatus 208 and the bus 211 and is an input/output apparatus which inputs video data through the bus 211 and outputs it to the display apparatus 208 to display the video data on the display apparatus 208. A communications I/F 204 is an interface for connecting the bus 211 to a network circuit of the Internet and the like. The bus 211 enables communications between apparatuses connected thereto.

Figure 1:
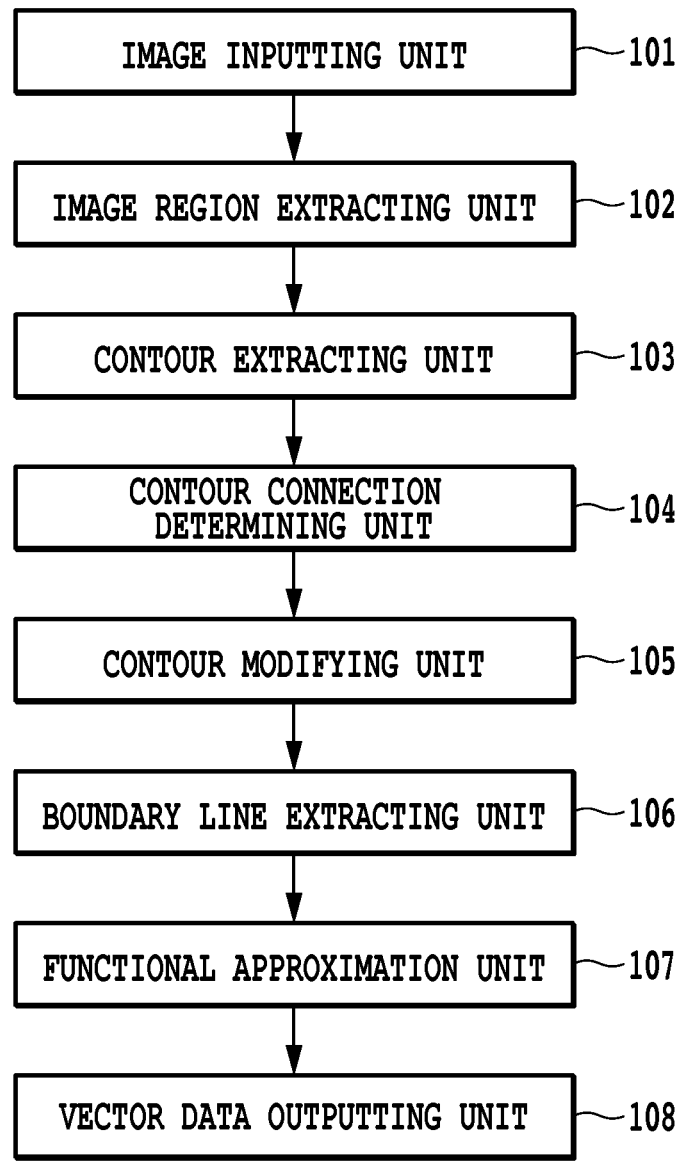
FIG. 1 is a functional construction diagram of an image processing apparatus according to an embodiment of the present invention.

FIG. 1 is a functional block diagram of an image processing apparatus according to Embodiment 1 of the present invention. An image inputting unit 101 is constructed of the scanner 201 and the like and inputs image data for outputting vector data. The inputted image data is stored in a memory device such as an image memory 202.

An image region extracting unit 102 executes clustering processing (color region dividing processing) the inputted image data to divide each group of pixels each showing the same feature value (pixel value) into an individual cluster (color region). That is, it is determined that the pixel having the similar pixel value is constructed of the same color, and such pixel is categorized into the same cluster. It should be noted that when the cluster number is more than a predetermined target value in this case, the cluster number may reduce to less than the target value by integrating the similar clusters each other. At this time, clusters determined as noises may be eliminated. In addition, the image region extracting unit 102 executes labeling processing by eight connections to each divided cluster to apply the same label number to each group of pixels connected by eight connections. As a result, the same label number is applied to each image region having the same feature value and connected by any of eight directions. The label number is associated with each image region in such a manner that the image region is identifiable, which will be stored in the memory apparatus such as the RAM 205. It should be noted that in the present embodiment, an explanation is made such that the labeling processing is executed after the clustering processing, but not limited thereto, the labeling processing and the clustering processing may be simultaneously executed. For example, at the time of applying labels to the respective pixels in the image, it is checked whether or not the pixels having the same feature value are adjacent to each other in any of the eight directions. When these pixels are adjacent to each other, the same label may be applied to them.

A contour extracting unit 103 executes contour line extracting processing by eight connections for each label region to which each label number is applied by the image region extracting unit 102. For example, when the respective label numbers are defined as processing targets in order, pixels to which the label numbers as the processing target are applied are defined as 1 and pixels other than that are defined as 0, the image can be treated as a binary image. Therefore, contour lines in image regions connected by eight connections may be extracted by using the respective binary images. That is, in the same way as the technology described in Japanese Patent Publication No. 3026592, the contour vectors connected by eight connections are detected by detecting each of the binary images by a raster scan of a matrix unit of 3×3 pixels, and the contour line may be extracted by interlinking the detected contour vectors. As a result of executing the contour line extracting processing, the contour extracting unit 103 associates the image region (label region) to which each label number is applied with the vector data showing the contour line in the image region, which will be stored in the memory apparatus such as the RAM 205. It should be noted that the contour line to be extracted includes both an outer contour extracted by the eight connections and an inner contour extracted by the eight connections to the label region.

If there are some inner contours extracted from the same label region, a contour connection determining unit 104 refers to coordinates of vector data constituting each extracted contour line to determine whether or not connection points connectable by eight connections exist in the each extracted contour line. If it is determined that the connectable connection point exists, the contour connection determining unit 104 associates the contour lines with the connection point, which will be stored in the memory apparatus such as the RAM 205.

If the connection point is determined by the contour connection determining unit 104, a contour modifying unit 105 connects the contour lines each other to be connected at the connection points to generate a new contour line for modifying the contour lines. Then, the contour modifying unit 105 has the memory device such as the RAM 205 to store vector data of the new contour line associated with this label region.

A boundary line extracting unit 106 detects contour lines identical among the contour lines of the respective image regions subjected to the contour modification and extracts the detected contour line as a boundary line for each segment in common between the adjacent image regions (label regions). Herein, positions in which the image regions of three or more colors (three regions) are in contact with each other are defined as intersecting points and the contour lines are divided for each intersecting point, thus making it possible to extract a boundary line between the two adjacent image regions. It should be noted that in regard to the contour line with no intersecting point, the corresponding contour line may be treated as the boundary line as it is. In addition, the boundary line extracting unit 106 is configured in such a manner that reconfiguration information formed by associating the extracted boundary line with the image region corresponding thereto is stored in the memory apparatus such as the RAM 205.

A functional approximation unit 107 performs a functional approximation of the boundary line to generate vector data showing the boundary line of post-approximation. In addition, the functional approximation unit 107 associates the boundary line subjected to the functional approximation with the image region, which will be stored in the memory device such as the RAM 205.

A vector data outputting unit 108 connects the approximated boundary lines based on the reconfiguration information to generate/output vector data showing outline of each image region.

Figure 6:
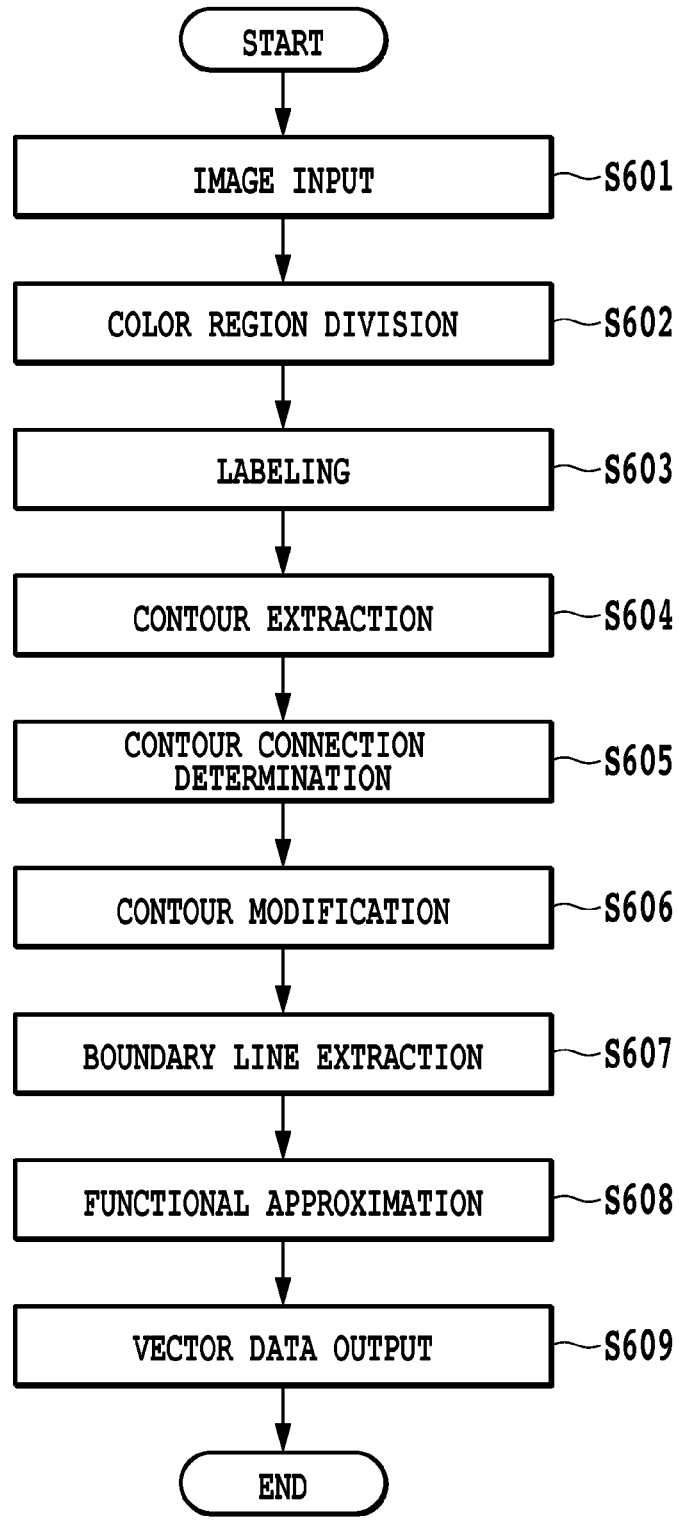
FIG. 6 is a flow chart showing main processing of an image processing apparatus in Embodiment 1.

Next, the processing procedure for carrying out the present invention will be explained with reference to a flow chart in FIG. 6. First, at step S601, image data as a processing target is inputted into the image processing apparatus. In this image inputting processing, for example, the image data read by the scanner 201 is stored in the image memory 202 through the video input/output I/O 203. In addition, for example, the image data containing the image region as the processing target may be inputted from an outside of the image processing apparatus through communications I/F 204 to the image processing apparatus to be stored in the image memory 202. Further, for example, the image data in advance stored in the external storage apparatus 212 may be stored in the image memory 202 through the I/O 213. In this way, the obtained image data by the image input at step S601 is retained in the image memory 202. The image inputting processing at step S601 is executed by the image inputting unit 101.

Then, the inputted image data is divided into a group (cluster) of pixels having the same feature value (pixel value) by color region dividing processing (clustering processing) at step S602. Additionally, it may be possible to process noise filtering at this time. For example, noise may be filtered such that cluster determined as noise in clusters divided by clustering processing is integrated with an adjacent cluster similar to the determined cluster. The technology of the color region dividing processing is as available as the technology described in Japanese Patent Laid-Open No. 2006-344069. In addition, the inputted image data, but is not limited to, is processed by the color region dividing processing. For example, the inputted image data is divided into a plurality of regions (e.g. character region, picture region, or clip art image) according to the attribute and the clip art image (image such as an illustration below a predetermined color number) is processing object for the color region dividing processing.

Then, the labeling processing by eight connections is performed for each cluster divided by the color region dividing processing at step S603. In the labeling processing by eight connections, the same label number is labeled to each group of pixels having the same feature value, which is connected by eight connections in any eight directions. In addition, the color region dividing processing at step S602 and the labeling processing at step S603 are executed by the image region extracting unit 102. That is, the image region extracting unit 102 extracts from the inputted image data an image region composed of groups which of pixels having the same feature value (same color) are connected by eight connections.

Then, the contour extracting processing is executed to extract contour lines from each of image regions composed of pixels having the same labeled number by eight connections at step S604. As described above, contour lines are extracted in order of labeled number from each group of pixels. First, 1 is associated with pixel having the labeled number of processing object and 0 is associated with other pixel, for generating a binary image. Then, contour lines connected by eight connections are detected by a raster scan of a matrix unit of 3×3 pixels. In addition, the present embodiment utilizes the technology disclosed in Japanese Patent Publication No. 3026592, that, but is not limited to, contour lines are extracted from a binary image. In this embodiment, a contour line obtained first among contour lines extracted is inevitably an outer contour. This is due to performing a raster scan on an image in the technology disclosed in Japanese Patent Publication No. 3026592, and in a case of performing the raster scan, the outer contour is extracted before the inner contour without fail. By using this feature among the extracted contour lines, the contour line first extracted is the outer contour without fail, and in a case where the contour line to be next extracted exists, all the remaining contour lines are the inner contours. Therefore, the contour line first extracted can be treated as the outer contour and the contour lines to be extracted after that can be treated as the inner contours. It should be noted that the contour extracting processing at step S604 is realized by the contour extracting unit 103.

Next, the contour connection determining processing is performed at step S605. If plural inner contours exist in the contour lines obtained at step S604, it is determined whether or not an inner contour and the other inner contour can be connected in an inclined direction at a connection point. The contour connection determining processing at step S605 will be explained with reference to FIGS. 7A-7E.

Figures 7A, 7B, 7C:
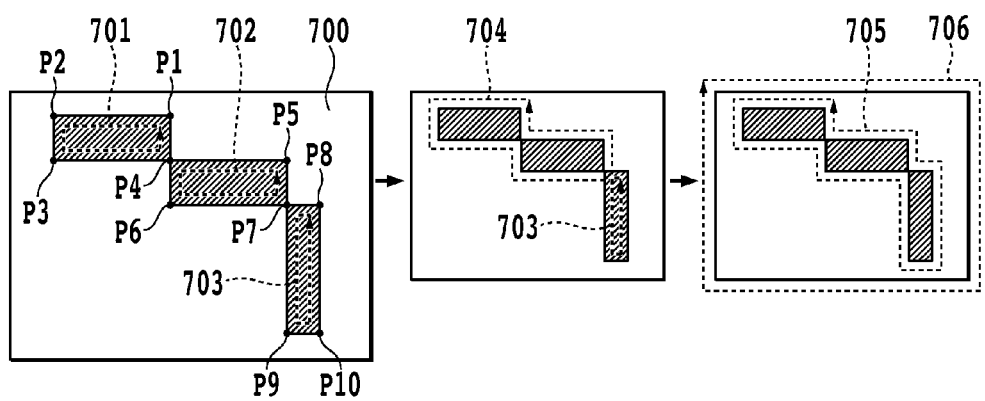
FIGS. 7A-7E are diagrams for explaining connection determining processing and contour modifying processing in Embodiment 1.
Figures 7D, 7E:
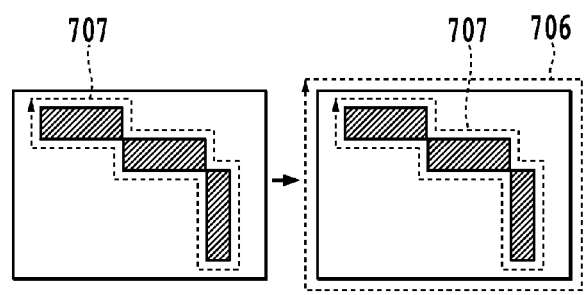

FIG. 7A shows an image region 700, inner contours 701-703, and respective coordinates P1-P10. The image region 700 is composed of white pixels. The inner contours 701-703 are contour lines extracted from the image region 700 by the contour extracting processing at step S604. The coordinates P1-P10 are elements of the inner contours 701-703. If the contour extracting processing is performed by eight connections, three inner contours are extracted from the image region 700 as shown in FIG. 7A, because two white pixels connected in an inclined direction are determined as connecting each other. The inner contour 701 is composed of coordinates P1 to P4, the inner contour 702 is composed of coordinates P4 to P7, and the inner contour 703 is composed of coordinates P7 to P10. Herein, the inner contour 701 is printed as vector data showing a closed curve which goes from P1 as a starting point, through P2 and P3, and from P4 back to P1 again. This vector data may be constructed of a data structure in which, for example, the respective coordinates are stored in the order from a starting point to an end point, such as (P1, P2, P3 and P4). Likewise, the inner contour 702 is vector data having the data structure of (P5, P4, P6 and P7), and the inner contour 703 is vector data having the data structure of (P8, P7, P9 and P10).

The contour connection determining processing determines whether or not connection points exist at which each inner contour can be connected in an inclined direction to the other inner contour by eight connections. For example, first, on a basis of the inner contour 701 presence/absence of connection points thereof to the inner contour 702 and the inner contour 703 is determined. Specifically, the respective coordinates constituting the inner contour 701 are compared with the respective coordinates constituting the inner contour 702 and the inner contour 703. When the identical coordinate exists, it is determined that the connection point exists by defining the identical coordinate as the connection point. In an example of FIG. 7A, since P4 among the coordinates constituting the inner contour 701 is identical to P4 among the coordinates constituting the inner contour 702, P4 is defined as the connection point. In addition, coordinate P4 showing that the inner contour 701 and the inner contour 702 are connectable at P4 is associated with the inner contour 701 and the inner contour 702, which will be stored. Since the identical coordinate does not exist between the inner contour 701 and the inner contour 703, presence/absence of a connection point to the inner contour 703 is next determined on a basis of the inner contour 702. At this time, since P7 among the coordinates constituting the inner contour 702 is identical to P7 among the coordinates constituting the inner contour 703, P7 is defined as the connection point. In addition, coordinate P7 showing that the inner contour 702 and the inner contour 703 are connectable at P7 is associated with the inner contour 702 and the inner contour 703, which will be stored. In this way, the contour connection determining processing determines, when the plural inner contours in regard to the contour lines extracted by the contour extracting processing in the previous step exist, in order whether or not connection points exist in the respective inner contours. When the connection point exists, it is associated with the inner contour, which will be stored. It should be noted that the contour connection determining processing at step S605 is realized by the contour connection determining unit 104.

If it is determined at step S605 that the connection point exists, then a new contour line is generated at step S606 by connecting a inner contour with another inner contour at the connection point to modify the two inner contours according to a contour modifying processing. The contour modifying processing of step S606 is performed by a contour modifying unit 105. For example, as shown in FIG. 7A, if the inner contour 701 and the inner contour 702 are connectable at P4, there is generated a contour line 704 (FIG. 7B) modified for both the contour lines to be connected at P4. Specifically by adding the vector data of the inner contour 702 containing connection at P4 to the vector data of the inner contour 701, the vector data of the contour line 704 is defined as (P1, P2, P3, P4, P6, P7, P5 and P4). Next, since it is determined that the inner contour 702 and the inner contour 703 are connected at 27, there is generated a contour line 705 (FIG. 7C) modified so that the contour line 704 is connected to the inner contour 703 at P7. Specifically by adding the vector data of the inner contour 703 containing connection at P7 to the vector data of the contour line 704, the vector data of the contour line 705 is defined as (P1, P2, P3, P4, P6, P7, P9, P10, P8, P7, P5 and P4).

At this time, if a direction of the inner contour is compared with a direction of the outer contour, the outer contour 706 of the region composed of white pixels has a right turning. On the other hand, the contour line 705 as the inner contour has a left turning. It is preferable that for extracting a boundary line described later at step S607, a vector direction of the outer contour extracted from the grey pixels is identical to that of the inner contour extracted from the white pixels. Thus, if the vector directions are not identical, the vector directions are modified to be identical in the contour connection determining processing. Especially, in regard to the vector data of the contour line 705, the vector data is replaced in such a manner as to form a reverse route from P1 as a starting point. That is, the vector data of the contour line 705 can be defined as (P1, P4, P5, P7, P8, P10, P9, P7, P6, P4, P3 and P2) to form the contour line 707 shown in FIG. 7D. By the contour modifying processing explained above, finally the outer contour 706 and the contour line 707 as the inner contour shown in FIG. 7E can be obtained as the contour lines of the image data shown in FIG. 7A.

Figure 8A:
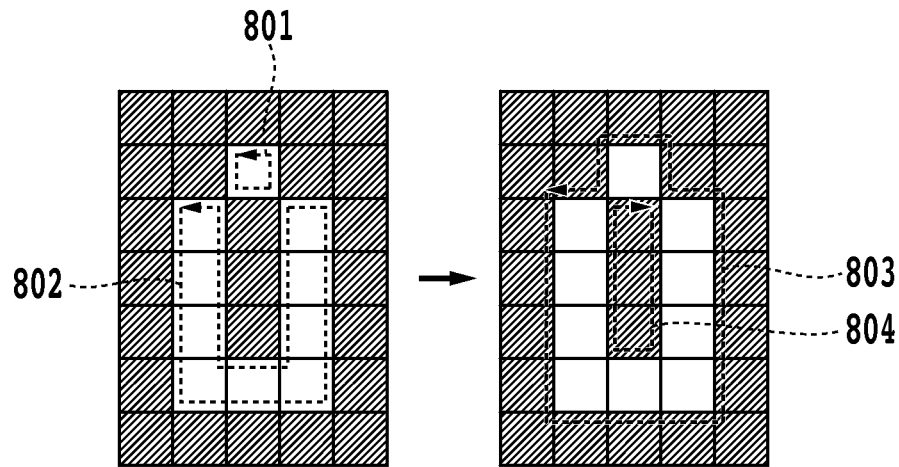
FIGS. 8A-8B are diagrams for explaining an example in a case of not connecting inner contours in regard to the contour modifying processing in Embodiment 1.

It should be noted that in an example of the contour modifying processing shown in FIGS. 7A-7E, all the inner contours are connected to each other, but there are some cases where the special processing is required depending on the connection aspect of the inner contours. For example, when the contour extracting processing by eight connections is performed to the grey image region, the two inner contours 801 and 802 are extracted as shown in FIG. 8A. In this case, the two inner contours 801 and 802 are separated at the two connecting points and the separated inner contours are combined individually to be modified to two contour lines 803 and 804. At this time, considering that the gray pixels adjacent in an inclined direction in the gray image region are not connected, the gray image region can be thought to be segmentized into two regions at the outside and the inside. Therefore, the modified contour line 803 may be assumed as an inner contour in the outside gray image region and the modified contour line 804 may be assumed as an outer contour in the inside gray image region.

Figure 8B:
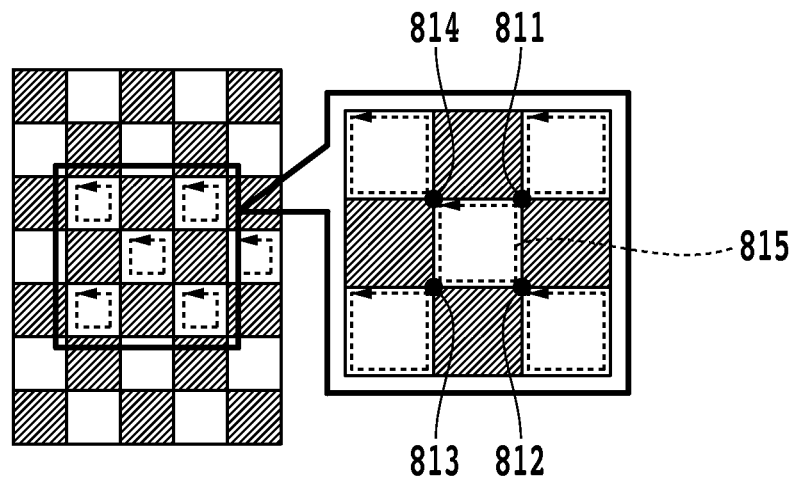

In addition, if a staggered lattice pattern is processed as shown in FIG. 8B, there are some points at which outer contours are mutually crossing. As in this case, the outer contour extracted from an image region may not be identical to the contour line composed of modified inner contours. Therefore, if such a staggered lattice pattern is processed, there is no need to connect among inner contours at connection point in an inclined direction. In addition, it is possible to determine whether to connect inner contours, based on the number of connection point at which inner contours are respectively connected (or the number of inner contour), instead of determining whether or not outer lines are crossing. For example, if three or more connection points exist, it is estimated that a line of the respective coordinates constituting the contour line is not defined as one line. In this case, it may be possible to remove the corresponding inner contour from the connection target. For example, as shown in FIG. 8B, in a case where four connections points (811 to 814) exist, an inner contour 815 may be removed from the connection target. It should be noted that the contour modifying processing at step S606 is realized by the contour modifying unit 105.

When the contour extracting processing and the contour modifying processing are completed for all the image regions, the boundary line extracting processing for extracting common contour lines from adjacent image regions to generate a boundary line is performed at step S607. Specifically, in regard to the respective coordinates constituting the contour line obtained until step S606, a target coordinate is set along the contour line, and the circumference of the width of 2×2 pixels around the target coordinate is referred to. Then, a point at which three or more image regions, which respectively have different feature value, intersect is defined as an intersection point. And then, a boundary line is extracted by dividing a contour line at each of an intersection point. At this time, reconfiguration information is stored to reconfigure the contour line of a corresponding image region by using a boundary line. The reconfiguration information is associating with a boundary line and a corresponding image region. In addition, the boundary line extracting processing at step S607 is performed by the boundary line extracting unit 106.

Figures 9A, 9B, 9C:
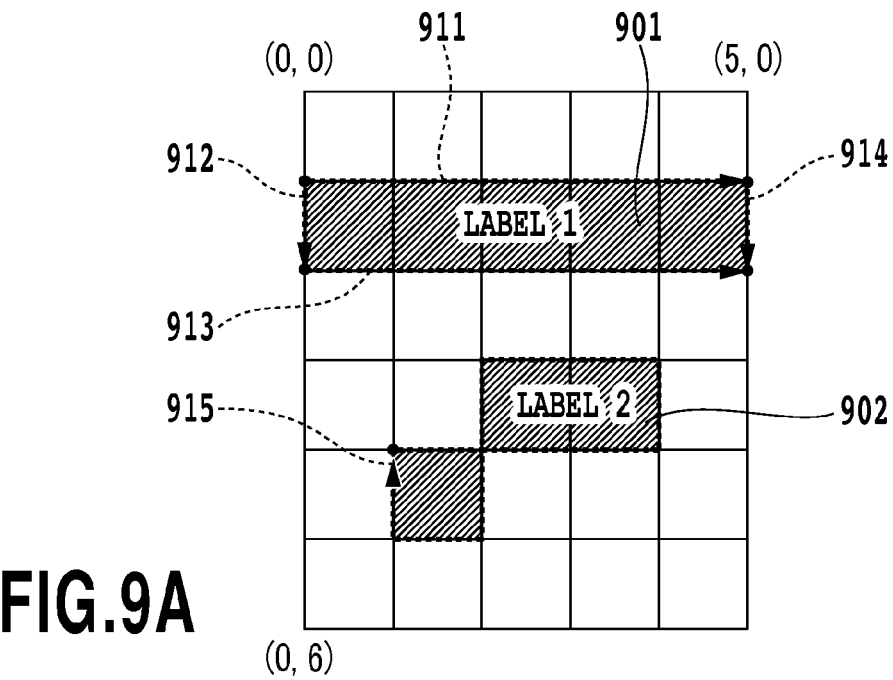
FIG. 9A is diagram for explaining boundary line extracting processing in Embodiment 1.
FIG. 9B is a data table (boundary line information) for storing data in regard to boundary lines.
FIG. 9C is reconfiguration information in regard to the boundary line.

FIG. 9A shows a relation between an image region and boundary lines. Lines 911 to 914 show boundary lines in regard to an image region 901 obtained by the processing for obtaining the above boundary line. A line 915 shows a boundary line in regard to an image region 902, and in an example shown in FIG. 9A, it is shown that one boundary line alone is associated with the image region 902.

FIG. 9B shows a data table (boundary line information) for storing data in regard to boundary lines, wherein an end point coordinate 922 and a direction 925 are associated with a line number 921. The line number 921 is a specific number allotted to the boundary line. The end point coordinate 922 shows a starting point coordinate 923 and an end point coordinate 924 in regard to the boundary line to which the specific line number 921 is allotted. For example, a starting point coordinate of the boundary line to which "1" is allotted as a line number is (0, 1) and an end point coordinate thereof is (5, 1). The direction 925 is, as shown in FIG. 9A, information showing a direction from the starting point coordinate 923 to the end point coordinate 924. For example, if the boundary line to which "1" is allotted as the line number, since a direction from the starting point coordinate to the end point coordinate is "right", information showing "right" is stored in the direction 925. For example, if the boundary line to which "5" is allotted as the line number, the boundary line shows a closed curve which goes from a starting point coordinate (1, 4), in the right direction along the outer periphery of the image region 902, and back to an end point coordinate (1, 4). It should be noted that the coordinate corresponds to a relation where a top leftist end of a pixel is defined as an original point, a right orientation from the original point is defined as a positive X axis direction, and a downward orientation from the original point is defined as a positive Y axis direction.

FIG. 9C shows reconfiguration information in regard to the boundary line. The reconfiguration information is a data table in which an image region and boundary lines are associated. Label numbers associated with the respective image regions are stored in the column of an image region 931. Line numbers of a boundary line which is used for reconfiguring are stored in the column of a boundary line 932. Herein the reconfiguring means to connect the boundary lines each other according to the order of the line number to reconfigure vector data of the boundary line. For example, if a contour line of the image region 901 labeled "1" is reconfigured, it may be possible to connect the lines in line number order like line "1", line "4", line "3" (reverse order), and line "2" (reverse order) as shown in FIG. 9O. Herein, the reverse order of the line "2" and the line "3" shows that in a case where the reconfigured contour line is a closed curve, the boundary line is reverse by 180° to the direction 925 in the boundary line information shown in FIG. 9B. It should be noted that in the image region associated with the label number "2", only one boundary line exists, and in the reconfiguration information, the line number "5" alone is stored as the boundary line.

Next, the functional approximation processing for generating a smooth vector by the functional approximation of a boundary line obtained by the boundary line extracting processing at step S607 is performed at step S608. The functional approximation processing may be performed, for example, by using a Bezier curve described in Japanese Patent Laid-Open No. 2005-310070. It should be noted that the functional approximation processing at step S608 is realized by the functional approximation unit 107.

Finally, vector data is generated by connecting boundary lines of the functional approximation based on the reconfiguration information of an image region obtained at step S608, and outputted. It should be noted that the vector data outputting processing at step S609 is performed by the vector data outputting unit 108.

(Embodiment 2)

In Embodiment 1, the contour connection determining processing, the contour modifying processing, and boundary line extracting processing are executed to all the image regions. However, when processing a single-color image composed of image regions in a single color, it may be possible not to execute the above processing since a boundary line does not exist. Therefore, in Embodiment 2, it is determined after extracting the contour line whether or not the image region as the processing target is in contact with the image region of the background color only. If the image region for the processing is in contact with an image region other than the image region of a background color, the contour connection determining processing, the contour modifying processing, and the boundary line extracting processing are executed in the same way as in Embodiment 1. On the other hand, if the image region for the processing is in contact with the image region of a background color only, since the image region for the processing is a single-color image, the contour line extracted by the contour line processing is subjected to the functional approximation as it is.

Figure 10:
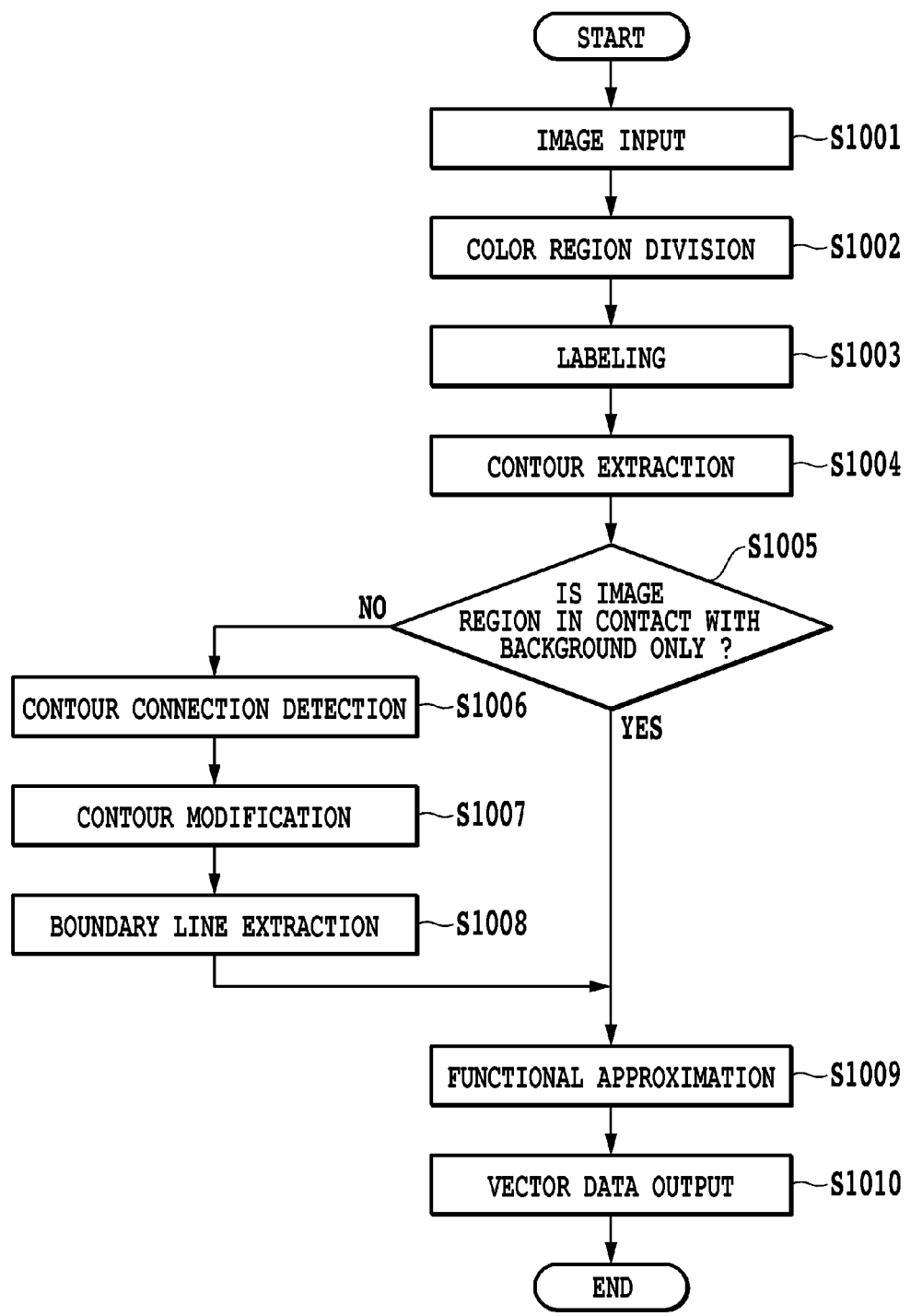
FIG. 10 is a flow chart showing main processing of an image processing apparatus in Embodiment 2.

FIG. 10 shows a processing flow in Embodiment 2 and FIGS. 11A-11E shows an explanation of the determining processing at step S1005 in FIG. 10. It should be noted that the processing from step S1001 to step S1004 is the same as the processing from step S601 to step S604 shown in FIG. 6 in Embodiment 1. In Embodiment 2, after extracting the contour extracting processing at step S1004, next at step S1005 it is determined whether or not an image region is in contact with an image region of the background color only. It should be noted that the processing from step S1006 to step S1010 is the same as the processing from step S605 to step S609 shown in FIG. 6 in Embodiment 1.

FIG. 11A shows inputted image data 1100 obtained at step S1002, which contains a white image region 1101, a gray image region 1102, and black image regions 1103 and 1104. First, a background color is selected in the image data 1100. For example, a binary image 1110 as shown in FIG. 11B is generated by binarizing the image data 1100 and a background color is selected such that the color of the image region which has a larger area than other image regions in the binary image 1110 is selected as the background color. In the binary image 1110, a color (that is, white color) in the image data 1100 at a position corresponding to the white region is selected as a background color, since a white region is larger than a sum of black regions 1111 and 1112. In addition, the black regions 1111 and 1112 in the binary image 1110 are selected as foreground portions. Therefore, regions at positions corresponding to the foreground portions (the gray image region 1102, and the black image regions 1103 and 1104) in the image data 1100 are determined as foregrounds.

In addition, the method for selecting a foreground and background is not limited to the above described method. For example, the background color may be selected based on the proportion of the color occupying a large area in the image data 1100. White color as shown in FIG. 11A may be selected as the background color because white color occupies a large area in the image data 1100.

Then, it is determined whether or not the image region of a color selected as the foreground is only in contact with the image region of the background color. For example, it is determined that the image region 1103 is in contact also with an image region other than the background since the shape of the image region 1103 of black color shown in FIG. 11C is not identical to the shape of the foregrounds 1111 in the binary image data 1110 in FIG. 11B. Likewise, it is determined that the image region 1102 is in contact also with an image region other than the background, since the shape of the image region 1102 of grey color shown in FIG. 11D is not identical to the shapes of the foregrounds 1111 and 1112 in the binary image data 1110 in FIG. 11B. On the other hand, it is determined that the image region 1104 is in contact with the background only, since the shape of the image region 1104 of black color shown in FIG. 115 is identical to the shape of the foreground 1112 in the binary image data 1110.

If it is determined that an image region is in contact also with the image region other than the background (step S1005; NO), the contour line of the image region is modified based on the process at step S1006 to S1007. Then, the boundary line extracted at step S1008 is subjected to the functional approximation at step S1009. In the example shown in FIGS. 11A-11E, in regard to the image region 1102 and the image region 1103, after the contour line is modified based on the process of step S1006 to S1008, the boundary line is extracted, and the reconfigured line is subjected to the functional approximation at step S1009.

On the other hand, in a case where it is determined that an image region is in contact with the background only (step S1005; YES), the boundary line of the image region is subjected to the functional approximation at step S1009. In this example, the boundary line in the image region 1104 corresponds to the boundary line of the above image region, and the boundary line in common to the image region 1101 is subjected to the functional approximation at step S1009.

In this way, the boundary line in each image region is subjected to the functional approximation at step S1009. In addition, then at step S1010, generated vector data is outputted based upon the contour line subjected to the functional approximation in the same way as at step S609.

(Other Embodiments)

In addition, it may be possible to be configured with a hardware such as an electronic circuit, instead of each unit as shown in FIG. 1. Also, it may be possible that a computer executes a program to function as each unit shown in FIG. 1. In addition, the present invention is realized by executing the following processing. That is, it is the processing where software (program) for realizing the function of the aforementioned embodiment is supplied to the system or the apparatus through a network or various types of storage mediums and a computer (or CPU, MPU, the like) in the system or the apparatus reads out programs for the execution.

The embodiments according to the present invention are explained, but most of the processing in the embodiment are executed by computer programs executed on an information processing apparatus. Therefore, the present invention includes the computer programs as the scope without mentioning. The computer program is usually stored in a computer-readable storage medium such as a RAM, a ROM, or a CD-ROM, which is set to a computer. In addition, the computer program can be copied or installed in the system to be executed. Accordingly, such a computer-readable storage medium is also in the scope of the present invention without mentioning.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-062503, filed Mar. 18, 2010, and No. 2011-044132, filed Mar. 1, 2011, which are hereby incorporated by reference herein in their entirety.

What is claimed is:

1. An image processing apparatus comprising:
an extraction unit configured to extract, from a connected component, a first outer contour line, a first inner contour line and a second inner contour line of the connected component;
a determination unit configured to determine two points where the extracted first inner contour line and the extracted second inner contour line are connected;
a division unit configured to
divide the extracted first inner contour line at the determined two points into two contour lines, and
divide the extracted second inner contour line at the determined two points into two contour lines;
a generation unit configured to
generate a third inner contour line by combining one of the two lines obtained by the dividing of the extracted first inner contour line and one of the two lines obtained by the dividing of the extracted second inner contour line, and
generate a second outer contour line by combining the other of the two lines obtained by the dividing of the extracted first inner contour line and the other of the two lines obtained by the dividing of the extracted second inner contour line; and
a function approximation unit configured to perform a respective function approximation using each of the extracted first outer contour line, the generated third inner contour line, and the generated second outer contour line.

2. The image processing apparatus according to claim 1, wherein the function approximation unit is configured not to perform a function approximation using the first inner contour line and the second inner contour line.

3. The image processing apparatus according to claim 1, wherein the extraction unit is configured to extract three contour lines by raster scanning of the connected component,
and wherein the firstly extracted one of the three contour lines is set as the first outer contour line, and the others of the three contour lines are set as the first inner contour line and the second inner contour line.

4. An image processing apparatus comprising:
an extraction unit configured to extract, from a connected component, a first outer contour line, a first inner contour line and a second inner contour line of the connected component;
a determination unit configured to determine two points where the extracted first inner contour line and the extracted second inner contour line are connected;
a division unit configured to
divide the extracted first inner contour line at the determined two points into two contour lines, and
divide the extracted second inner contour line at the determined two points into two contour lines;
a generation unit configured to
generate a contour line by combining one of the two lines obtained by the dividing of the extracted first inner contour line and one of the two lines obtained by the dividing of the extracted second inner contour line; and
a function approximation unit configured to perform a respective function approximation using each of the extracted first outer contour line and the generated contour line.

5. A non-transitory computer readable storage medium storing a program for causing a computer to perform the image processing method according to claim 4.

6. An image processing apparatus comprising:
an extraction unit configured to extract, from a connected component, a first outer contour line, a first inner contour line and a second inner contour line of the connected component;
a determination unit configured to determine two points where the extracted first inner contour line and the extracted second inner contour line are connected;
a division unit configured to
divide the extracted first inner contour line at the determined two points into two contour lines, and
divide the extracted second inner contour line at the determined two points into two contour lines;
a generation unit configured to generate an inner contour line by combining one of the two lines obtained by the dividing of the extracted first inner contour line and one of the two lines obtained by the dividing of the extracted second inner contour line; and
a function approximation unit configured to perform a respective function approximation using each of the extracted first outer contour line and the generated inner contour line.

7. An image processing method comprising the steps of:
extracting, from a connected component, a first outer contour line, a first inner contour line and a second inner contour line of the connected component;

determining two points where the extracted first inner contour line and the extracted second inner contour line are connected;

dividing the extracted first inner contour line at the determined two points into two contour lines;

dividing the extracted second inner contour line at the determined two points into two contour lines;

generating an inner contour line by combining one of the two lines obtained by the dividing of the extracted first inner contour line and one of the two lines obtained by the dividing of the extracted second inner contour line; and performing a respective function approximation using each of the extracted first outer contour line and the generated inner contour line.

8. A non-transitory computer readable storage medium storing a program for causing a computer to perform the image processing method according to claim 7.

* * * * *